3,385,762
PROCESS FOR THE PRODUCTION OF L-TRYPTOPHAN BY FERMENTATION
Hiroshi Okazaki, Musashino-shi, Tokyo, Japan, assignor to Chugai Seiyaku Kabushiki Kaisha, Chuo-ku, Tokyo, Japan, a corporation of Japan
No Drawing. Filed June 15, 1965, Ser. No. 464,209
Claims priority, application Japan, June 29, 1964, 39/36,341
6 Claims. (Cl. 195—29)

ABSTRACT OF THE DISCLOSURE

Production of L-tryptophan by the cultivation of a L-tryptophan producing mutant of the microorganism Micrococcus in an aqueous nutrient medium in the presence of at least one precursor selected from the group consisting of anthranilic acid and indole.

---

The present invention relates to a process for the production of L-tryptophan by fermentation.

L-tryptophan has been produced before by cultivation of a specific mutant of Micrococcus, both phenylalanine, and tyrosine requiring mutant but its concrete cultivating conditions and yield are not clear.

The inventor has studied on use of several substances as a precursor in the production of L-tryptophan by fermentation with bacteria and has found that L-tryptophan may be easily produced and accumulated in a culture medium when bacteria belonging to the genus Micrococcus are used and anthranilic acid or indole is added in the medium as a precursor.

According to the present invention a process for the production of L-tryptophan is provided which comprises cultivating the L-tryptophan-producing bacteria belonging to the genus Micrococcus in a nutrient medium containing anthranilic acid or indole and recovering L-tryptophan produced and accumulated in the medium.

As suitable bacteria in the present invention it may be mentioned *Micrococcus luteus, Micrococcus varians, Micrococcus epidermidis* and their mutants the microbial characteristics of which are described in "Bergey's Manual of Determinative Bacteriology." Phenylalanine- and tyrosine-requiring mutant as well as both requiring mutant also may be used. When these bacteria are used the amount of other by-produced amino acids, for example, alanine, valine and the like is very small.

According to the present invention any usual known nutrient medium may be used. It is advantageous to use glucose, fructose and the like as a carbon source, ammonium chloride, ammonium sulfate, ammonium phosphate, urea and the like as a nitrogen source, yeast extract, meat extract, casein hydrolyzate, dried yeast and the like as an organic nutrient and potassium monohydrogen phosphate, potassium dihydrogen phosphate, magnesium sulfate, calcium carbonate, ferrous sulfate, manganese sulfate and the like as an inorganic salt. Further in compliance with the bacteria to be used, growth accelerating factors required by said bacteria, for example, when *Micrococcus luteus* is used the vitamin B-group such as thiamine, nicotinic acid, p-aminobenzoic acid and the like and amino acids such as glutamic acid and the like may be properly added.

According to the present invention, a precursor may be added in advance to the medium prior to cultivation. However when the growth of bacteria is prevented by such previous addition of a precursor, for example, in case of both phenyl-alanine and tyrosine requiring mutant of *Micrococcus luteus* being used and indole being added, an extraordinary advantageous result may be obtained by addition of a precursor after the bacteria has grown to some extent. Further it is preferable to add anthranilic acid little by little throughout the cultivation. However, the entire amount of anthranilic acid may be added at any stage of the cultivation except the first one. The proper amounts of anthranilic acid and indole are 1000–1500 mg./l. and 50–1500 mg./l. respectively. Anthranilic acid and indole may be naturally used at the same time. The yield of the desired product may be increased by addition of serine together with these precursors.

The cultivation may be carried under an aerobic condition such as shaking culture and submerged aerobic culture at 25–30° C. and at the range of pH 7–8. L-tryptophan may be easily separated from the fermentation broth after removal of cells by any known method, for example, by adsorbing L-tryptophan on active carbon and eluting with hot ethanol.

The present invention is explained by way of examples as follows. In the examples percentage is by w./v.

EXAMPLE 1

A seed culture fluid was prepared by inoculating a platinum loop of *Micrococcus luteus* in 15 ml. of bouillon medium and cultivating under shaking at 30° C. for 24 hours.

1200 ml. of a nutrient medium of pH 7.4 containing 10% glucose, 0.8% $NH_4Cl$, 1.0% yeast extract, 0.1% $KH_2PO_4$, 0.1% $K_2HPO_4$, 0.05% $MgSO_4 \cdot 7H_2O$, 2.0% $CaCO_3$ and 0.1% anthranilic acid (by w./v.) was put into each of twelve 500 ml. shaking flasks by 100 ml. To each flask 1.0 ml. of the seed culture fluid was inoculated and cultivated under shaking at 30° C.

After cultivation for 96 hours and 120 hours 340 mg./l. and 860 mg./l. of L-tryptophan were accumulated in the medium respectively. After completion of cultivation 1 l. of the supernatant of the broth resulted from separation of cells by centrifuge was adjusted to pH 8.0 with NaOH and 25 g. of active carbon was added to adsorb L-tryptophan which was eluted with 300 ml. of hot ethanol and the elute was concentrated under a reduced pressure to give 0.65 g. of L-tryptophan crystals.

EXAMPLE 2

500 ml. of a nutrient medium of pH 7.4 containing 10% glucose, 1.0% $NH_4Cl$, 0.1% $K_2HPO_4$, 0.1% $KH_2PO_4$, 0.05% $MgSO_4 \cdot 7H_2O$, 1.5% yeast extract, $2\gamma$/ml. $FeSO_4$, $2\gamma$/ml. $MnSO_4$, 0.13% anthranilic acid and 2.0% $CaCO_3$ was put into each of five 500 ml. shaking flasks by 100 ml. 0.5 ml. of a seed culture fluid of *Micrococcus luteus* (phenylanine-requiring mutant) was inoculated as in Example 1 and cultured under shaking at 30° C., for 120 hours, thereafter the cultured broth was treated as in Example 1 to give 0.51 g. of L-tryptophan crystals.

EXAMPLE 3

0.1 ml. of a seed culture fluid of *Micrococcus luteus* (both phenylalanine- and tyrosine-requiring mutant) was inoculated in 1 l. of a nutrient medium of pH 7.4 containing 10% glucose, 1.0% $NH_4Cl$, 0.1% $K_2HPO_4$, 0.1% $KH_2PO_4$, 0.05% $MgSO_4 \cdot 7H_2O$, 0.5% yeast extract, 1.0% corn steep liquor, 0.1% anthranilic acid and 2.0% $CaCO_3$ and cultivated under shaking at 30° C. for 120 hours. The cultured broth was treated as in Example 1 to give 0.48 g. of L-tryptophan crystals.

EXAMPLE 4

*Micrococcus luteus* (phenylalanine-requiring mutant) was inoculated and cultivated in the same nutrient medium as that in Example 1 containing 0.05% indole in place of anthranilic acid at 30° C., 120 hours. The cultured broth was treated as in Example 1 to give 0.54 g. of L-tryptophan.

EXAMPLE 5

*Micrococcus varians* was inoculated in 6 ml. of a nutrient medium of pH 7.4 containing 10% glucose, 0.5% urea, 1.0% meat extract, 0.1% $KH_2PO_4$, 0.1% $K_2HPO_4$, 0.05% $MgSO_4 \cdot 7H_2O$, 0.1% anthranilic acid and 2.0% $CaCO_3$ and cultivated under shaking for 96 hours as in Example 1 to give 540 mg./l. of L-tryptophan.

EXAMPLE 6

*Micrococcus epidermidis* was cultivated under shaking for 96 hours as in Example 1 to give 240 mg./l. of L-tryptophan.

EXAMPLE 7

*Micrococcus luteus* (tryptophan-requiring mutant) inoculated in a nutrient medium containing 10% glucose, 1.2% yeast extract, 0.8% $NH_4Cl$, 0.1% $K_2HPO_4$, 0.1% $KH_2PO_4$, 0.05% $MgSO_4 \cdot 7H_2O$, $10\gamma$/ml. $FeSO_4 \cdot 7H_2O$ and $10\gamma$/ml. $MnSO_4$ and cultivated for 48 hours, thereafter 1000 mg./l. of indole was added to the medium and further cultivated under shaking for 72–96 hours to give 1600 mg./l. of L-tryptophan.

EXAMPLE 8

*Mircococcus luteus* (tryptophan-requiring mutant) was cultivated for 48 hours as in Example 7, thereafter 1000 mg./l. of indole and 2000 mg./l. of DL-serine were added and further cultivated under shaking for 72 hours to give 1700 mg./l. of L-tryptophan.

I claim:

1. A process for the production of L-tryptophan which comprises cultivating the L-tryptophan-producing mutant belonging to the genus Micrococcus in an aqueous nutrient medium containing at least one precursor selected from the group consisting of anthranilic acid and indole and recovering L-tryptophan produced and accumulated in the medium.

2. A process for the production of L-tryptophan which comprises cultivating under aerobic conditions at a pH of from about 7 to about 8 the L-tryptophan-producing mutant belonging to the genus Micrococcus in an aqueous nutrient medium containing a source of carbon, a source of nitrogen, an organic nutrient, an inorganic salt in the presence of at least one precursor selected from the group consisting of anthranilic acid and indole.

3. A process as claimed in claim 2 in which the L-tryptophan-producing mutant belonging to the genus Micrococcus is selected from the group consisting of *Micrococcus luteus, Micrococcus varians* and *Micrococcus epidermidis*.

4. A process as claimed in claim 2 in which the amount of anthranilic acid is from about 1000 mg. to about 1500 mg. per liter of aqueous nutrient medium.

5. A process as claimed in claim 2 in which the amount of indole is from about 500 mg. to about 1500 mg. per liter of aqueous nutrient medium.

6. A process as claimed in claim 2 in which the culture temperature is from about 25° C. to about 35° C.

References Cited

UNITED STATES PATENTS

| | | | |
|---|---|---|---|
| 2,999,051 | 5/1961 | Malin | 195—29 |
| 3,036,958 | 3/1962 | Asai et al. | 195—29 |
| 3,293,141 | 12/1966 | Mateles et al. | 195—29 |
| 3,296,090 | 1/1967 | Enatsu et al. | 195—30 |

FOREIGN PATENTS 846,521  8/1960  Great Britain.

LIONEL M. SHAPIRO, *Primary Examiner.*